United States Patent [19]

Hicks

[11] 4,423,201

[45] Dec. 27, 1983

[54] CO-REACTIVE URETHANE SURFACTANTS AND STABLE AQUEOUS EPOXY DISPERSIONS

[75] Inventor: Darrell D. Hicks, Jeffersontown, Ky.

[73] Assignee: Celanese Corporation, New York, N.Y.

[21] Appl. No.: 437,706

[22] Filed: Oct. 29, 1982

[51] Int. Cl.$^3$ ............................................. C08G 18/32
[52] U.S. Cl. ................................... 528/76; 528/104; 560/26; 560/115; 560/133
[58] Field of Search .................... 528/76, 104; 560/26, 560/115, 133

[56] References Cited

U.S. PATENT DOCUMENTS

| | | | |
|---|---|---|---|
| 3,549,543 | 12/1970 | Kirstahler et al. | 252/152 |
| 3,987,033 | 10/1976 | Ojakaar | 560/26 |
| 4,079,028 | 3/1978 | Emmons et al. | 260/29.6 NR |
| 4,098,772 | 7/1978 | Bonk et al. | 528/49 |
| 4,180,491 | 12/1979 | Kim et al. | 260/29.2 TN |
| 4,315,044 | 2/1982 | Elmore et al. | 427/386 |
| 4,367,327 | 1/1983 | Holker et al. | 528/76 |

FOREIGN PATENT DOCUMENTS 1069735 5/1967 United Kingdom .

*Primary Examiner*—Maurice J. Welsh
*Attorney, Agent, or Firm*—Herbert P. Price

[57] ABSTRACT

Water dispersible epoxide resin compositions are made by reacting a diglycidyl ether of a dihydric phenol with a dihydric phenol and a co-reactive urethane surfactant. The co-reactive surfactant is prepared by reacting a long chain aliphatic polyether glycol with a diisocyanate and a dihydric phenol in a molar ratio of 1/X/X wherein X has a value of 2 to 6. Aqueous dispersions of the water dispersible epoxide resin composition can be formulated into coating compositions.

22 Claims, No Drawings

CO-REACTIVE URETHANE SURFACTANTS AND STABLE AQUEOUS EPOXY DISPERSIONS

BACKGROUND OF THE INVENTION

The field of art to which this invention pertains is surfactants for aqueous dispersions and to water dispersible epoxy resins.

In recent years, great emphasis has been placed in the coatings and plastics industry upon the replacement of organic-based solvents with aqueous-based systems. The reason for this change has been the increasing cost of these solvents and the pollution problems which result from the escape into the atmosphere of organic-containing compounds, such as hydrocarbons.

Epoxide-containing materials have been known for years to possess extremely desirable properties when used in coatings and plastics. Epoxides impart unique strength and chemical resistance properties to coating and plastics formulations. For these reasons, the use of epoxide resins, and more recently, the use of aqueous emulsions or dispersions of epoxide-containing materials has increased. However, because of their extreme reactivity and relatively high molecular weight, it has often been difficult to prepare stable, low viscosity, epoxy resin dispersions which are of relatively high solids.

Accordingly, there has been a search for dispersants which will permit the preparation of small particle sized and low viscosity, yet high solids, epoxide dispersions. One method of preparing dispersions has been to employ epoxide-based surfactants prepared by reacting two moles of a hydroxy terminated polyethylene glycol with one mole of a diepoxide. However, complete reaction of these materials without undue chain extension is difficult.

An additional problem which has impeded the preparation of epoxide dispersions is the difficulty in preparing satisfactory dispersants which are compatible with the epoxide resins.

These and other problems are overcome by preparing the compositions of the instant invention which may be employed to prepare small particle-sized, low viscosity, high solids, stable, epoxide resin dispersions. The compositions of the instant invention are of particular utility because they are prepared without undue chain extension.

In British Pat. No. 1,069,735, a process is disclosed for the production of a surface active reaction product which comprises reacting two moles of a diisocyanate, one mole of a dihydroxy polyether, and two moles of a monophenol. However, there is no disclosure in this patent of the use of these products with a polyepoxide to render it water-dispersible.

U.S. Pat. No. 3,549,543 discloses a combination of materials useful as low foaming, washing and cleansing agents. Included are certain ethylene oxide adduct dimers prepared using an aliphatic or aromatic diisocyanate. However, the specific compounds of the instant invention are not disclosed, nor is it disclosed to use these materials as co-reactive dispersants for polyepoxides.

U.S. Pat. No. 4,079,028 discloses the preparation of certain polyurethane-based materials employing polyhydroxy compounds, such as di- and trihydroxy benzene. The hydroxyl terminated prepolymers prepared in this patent generally are end-capped with either a monoisocyanate or a mono/diisocyanate mixture. This patent does not disclose the use of Bisphenol A materials, nor their use in combination with an aliphatic polyether glycol.

Non-reactive surfactants, useful in preparing stable aqueous dispersions of epoxy resins, are described in my copending application, Ser. No. 403,897, filed July 30, 1982. These non-reactive surfactants are made by reacting n moles of a diphenol with n+1 moles of a diisocyanate and two moles of a long-chain, aliphatic polyether glycol monoether.

U.S. Pat. No. 4,315,044 discloses stable epoxy resin dispersions made from the reaction product of (a) a diglycidyl ether of a dihydric phenol, (b) a dihydric phenol and (c) a diglycidyl ether of a polyoxyalkylene glycol.

SUMMARY OF THE INVENTION

This invention pertains to compounds useful in preparing aqueous dispersions of water insoluble compounds. In particular, this invention relates to urethane copolymers containing terminal phenolic groups. In other aspect, this invention pertains to water-dispersible epoxy resins made by reacting the phenolic hydroxyl group containing urethane copolymers with epoxy resins and dihydric phenols.

The urethane copolymer surfactants of this invention are prepared by reacting n moles of a dihydric phenol with n moles of a diisocyanate and 1 mole of a long-chain, aliphatic polyether glycol. The surfactant is illustrated by the following formula:

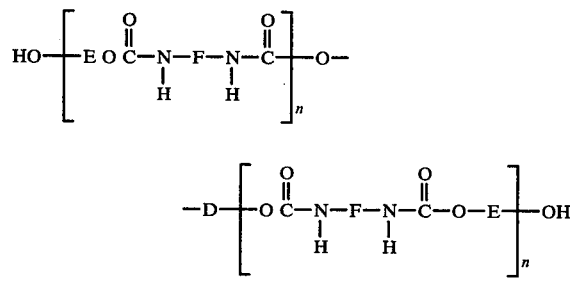

wherein n is 1–3, D is the residue of an aliphatic polyether glycol, E is the residue of a dihydric phenol and F is the residue of a diisocyanate.

The water dispersible epoxy resins are prepared by reacting 40–90 parts by weight of a diglycidyl ether of a dihydric phenol with 5–35 parts by weight of dihydric phenol and 2–15 parts by weight of the urethane copolymer surfactant. The resulting resinous composition will have a molecular weight within the range of 800–20,000.

DESCRIPTION OF THE INVENTION

The diisocyanate materials useful in the instant invention can be represented by the general formula OCN-F-NCO. Virtually any type of diisocyanate-containing material may be used in the instant invention, with the only requirement being that the diisocyanate backbone does not contain groups which interfere with its reaction with the diphenol and the long-chain, aliphatic, polyether glycol disclosed hereafter.

Isocyanates have been known for many years and those preferred in the instant invention may be characterized as aromatic, aliphatic or cycloaliphatic diisocyanates. As with the diphenol material used in this invention, it is preferred that the diisocyanate be similar in structure to the prolyepoxide which will ultimately be dispersed. Accordingly, if long-chain aliphatic epoxides are employed, it may be more preferable to use long-chain aliphatic isocyanates, such as, for example, hexamethylene diisocyanate. However, in most cases, since the polyepoxide employed will have an aromatic backbone, such as Bisphenol A, it is preferred that aromatic or cycloaliphatic diisocyanates be employed. Among the most preferred of the diisocyanates are isophorone diisocyanate, bis(p-phenyl isocyanate), bis(p-phenyl) methylene diisocyanate, bis(p-phenyl cyclohexyl) methylene diisocyanate, 2,4-toluene diisocyanate, 2,6-toluene diisocyanate, 1,4-phenylene diisocyanate, 1,3-phenylene diisocyanate, 4,4'-diphenylmethane diisocyanate, 4,4'-diphenyldimethylmethane diisocyanate, 1,5-naphthalene diisocyanate, 1,4-cyclohexane diisocyanate and the like.

The second major component of this invention is a diphenol. These materials are exemplified by resorcinol, hydroquinone, p,p'-dihydroxybenzophenone, p,p'-dihydroxydiphenyl, p,p'-dihydroxydiphenyl ethane, bis(2-hydroxynaphthylmethane), 1,5-dihydroxynaphthalene, and p,p'-dihydroxydiphenyl propane or Bisphenol A as it is commonly called. Also included are the various halogenated derivatives of the above-identified materials, such as the polyhalogenated bisphenols, including tetrabromo Bisphenol A.

The third component of the instant invention is a long-chain, aliphatic polyether glycol having the general formula H—O—D—O—H, wherein D is the residue of an aliphatic polyether glycol having a molecular weight of about 1000 to about 15,000. The long-chain aliphatic polyether glycols used in this invention usually are water soluble or at least partially soluble in water. The preferred long-chain aliphatic polyether glycols are the polyalkylene glycol types and are prepared by the condensation of an alkylene oxide with a suitable dihydric alcohol. Illustrative of alkylene oxides are ethylene oxide, propylene oxide and mixtures thereof. Illustrative of dihydric alcohols are ethylene glycol, 1,3-propylene glycol, 1,2-propylene glycol, 1,2-butylene glycol, 1,5-pentanediol, 1,4-pentanediol, 1,6-hexanediol, 1,7-heptanediol, 2,2-bis(4-hydroxycyclohexyl) propane, and the like.

Preferred long-chain aliphatic polyether glycols are those prepared by the reaction of ethylene oxide and/or propylene oxide with a dihydric aliphatic alcohol, e.g., ethylene glycol. Illustrative of useful polyether glycols are commercial Pluronic (BASF-Wyandotte) type products which are block copolymers of ethylene oxide and propylene oxide of about 5000–10,000 molecular weight, containing from about 50 to about 90 weight percent ethylene oxide and from about 10 to about 50 weight percent propylene oxide.

By employing the terms diisocyanate, dihydric phenol, or glycol in the above descriptions, it is not meant to preclude those materials which comprise a mixture of mono- and poly-functional materials, so that on the average the product employed contains approximately two functional groups. For purposes of this invention, the terms diisocyanate, glycol and dihydric phenol include materials having on the average about 1.5 to about 2.8 functional groups per molecule.

To prepare the surfactant compositions of this invention, about one mole of the long-chain aliphatic polyether glycol is reacted with x moles of the diphenol and x moles of the diisocyanate. Preferably x should be from 2 to 6. When x is greater than 6, higher molecular weight products result which are not as effective as co-reactive epoxide resin surfactants.

Although the three reactants can be reacted in any order, the most preferred reaction method involves adding to the reactor the diphenol and the long-chain glycol. This mixture is then heated to melting (usually in the range of about 60°–80° C.). At this point a reaction catalyst may be added.

Examples of the reaction catalysts include virtually any type of catalyst which will catalyze the reaction between the isocyanate, the alcohol and the diphenol. Included among these catalysts are tertiary amines and the various organo-metallic compounds and carboxylic acid salts of metals, such as tin, lead and mercury. Specific examples of such catalysts include trialkyl amines, as well as dialkyl tin dialkoxylates, including dibutyl tin dilaurate and the like. The amount of the catalyst to be added to the reaction mixture can vary widely, depending upon the speed of reaction which is desired and the particular reactants which have been chosen. However, generally, about 1–5%, by weight, based on the total weight of the reactants, of the reaction catalyst is added to the reaction mixture.

Following addition of the catalyst, the diisocyanate is added and the mixture is held at reaction temperature (about 25° C. to about 100° C. and preferably about 60° C. to about 80° C.) until all of the isocyanate groups have disappeared. Isocyanate reaction is monitored using standard techniques by removing a sample of the material, adding an amine, such as dibutylamine, and back titrating with an acid as HCl. Usually reaction of all isocyanate groups requires from about one-half hour to two hours of heating at reaction temperature.

The resulting product which contains terminal phenolic hydroxyl groups is then coreacted with a diglycidyl ether of a dihydric phenol and a dihydric phenol. The dihydric phenols used herein are the same as those hereinbefore described for use in preparing the coreactive dispersant. The diglycidyl ethers used herein are made by reacting the same dihydric phenols with an epihalohydrin using well known procedures described in U.S. Pat. Nos. 2,467,171, 2,615,007 and 2,801,227. The useful diglycidyl ethers have epoxide equivalent weights of 110 to about 350 and preferably about 175 to about 220. The preferred dihydric phenol is Bisphenol A.

The diglycidyl ether of the dihydric phenol is reacted with the diphenols using the procedures described in U.S. Pat. Nos. 3,547,881 and 3,948,855. The general method comprises adding the diglycidyl ether, the dihydric phenol and the dispersant, with or without catalyst to the reactor and heating and stirring to melt and mix the components. The temperature is then raised to about 115° to about 140° C. wherein the exothermic reaction raises the temperature to a maximum of about 165° to about 200° C. After the peak exothermic temperature is reached, the temperature is allowed to drop to about 150° to about 165° C. and is maintained at this temperature until the reaction is complete as evidenced by epoxide equivalent weight and melting point.

Epoxy-phenol catalyst well knwon in the art can be used if desired. Such catalysts are potassium hydroxide, sodium hydroxide, lithium hydroxide, lithium chloride, triphenylphosphine, quaternary ammonium hydroxides and halides, quaternary phosphonium hydroxides and halides, and the like.

In preparing the water-dispersible epoxy resin of this invention, about 40 to about 90 parts by weight of the diglycidyl ether of the dihydric phenol are reacted with about 5 to about 35 parts by weight of dihydric phenol and about 2 to about 15 parts of the urethane copolymer surfactant. The resulting epoxy resin will have an average molecular weight within the range of about 800 to about 20,000 and, preferably, 900–4000.

The compositions of this invention contain water-dispersion or water-solubilization sites within the epoxide resin itself. These solubilization or dispersion sites allow for the formation of aqueous dispersions of the epoxide resins. At the same time, the epoxide resin aqueous dispersions prepared from these resins maintain their reactive epoxide groups. Thus, the products prepared according to the instant invention exhibit improved stability when compared to epoxide-containing materials which are dispersed using prior art surfactants or stabilizers.

The epoxide resins which have been modified with the co-reactive surfactants herein may be dispersed in water by any number of methods well known in the art. The amount of water in which the epoxide resin/dispersant co-reaction mixture is dispersed may vary widely, depending on the epoxide resin and the dispersants which are chosen. However, the normal solids content of the final product is usually in the range of about 35% to 70% by weight.

Dispersion of the epoxide resin/urethane co-reaction products preferably is accomplished by slightly heating the product and adding up to about 30%, by weight, based on the polyepoxide/dispersant, of a cosolvent. Examples of such materials include the glycols, glycol ethers and glycol esters, including materials such as the various Cellosolves, including the monoethyl ether of ethylene glycol (ethyl Cellosolve), butyl Cellosolve (monobutyl ether of ethylene glycol) and Cellosolve acetate (acetate ester of monoethyl ether of ethylene glycol). (Cellosolve is a registered trademark of the Union Carbide Company.) Added to the reaction mixture along with the cosolvent is the amount of water desired. The amount of water present and the temperature at the point of inversion are critical in preparing emulsions which are of small, uniform particle sizes. At 80°–95° C., the water required is usually that amount needed to produce an emulsion having 72–77% solids. This mixture is then held under agitation at the desired temperature until a stable dispersion is obtained. (In some cases it may be necessary to increase the temperature slightly in order to form a stable dispersion.) Dispersion stability may be measured by monitoring its viscosity and holding at temperature until a stable viscosity is obtained.

Room temperature curable water-borne coating composition can be prepared by admixing a stable epoxy dispersion composition as described above with an epoxy-interacting curing vehicle, such as a polyamine curing agent. The ratio of active amino hydrogens to epoxy groups in the admixture is in the range of 0.5–2:1 and, preferably, is in the range between about 0.8–1.5:1. For purposes of industrial maintenance paint compositions, the amino hydrogens must be sufficiently reactive to effect crosslinking interaction with the epoxy groups at ambient tempertures.

Suitable polyamine curing agents are those which are soluble or dispersible in water and which contain more than 2 active hydrogen atoms per molecule. Examples of such curing agents are alkylene polyamines represented by the formula H$_2$N R(NH R)$_x$NH$_2$ wherein R is an alkylene radical containing 2 to 4 carbon atoms and X has the value of 0 to 5. Such alkylene polyamines are ethylene diamine, diethylene triamine, triethylene tetramine, tetraethylene pentamine, pentaethylene hexamine, propylene diamine, dibutylene triamine, and the like. Other polyamine curing agents are the polyamido amines, which are reaction products of alkylene polyamines and fatty acids. Such polyamidoamines are well known in the art and are described in U.S. Pat. Nos. 2,705,223, 2,811,495 and 2,899,397. Other polyamine curing agents are the adducts of polyamines and epoxy compounds such as those described in U.S. Pat. Nos. 2,651,589, 2,864,775 and 4,116,900.

Other curing agents can be used with the compositions of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tertbutyl phenol, and the like. Useful aldehydes are formaldehyde, acetaldehyde and propionaldehyde. Particularly useful phenolplast resins are polymethylol phenols wherein the phenolic group is etherified with an alkyl, e.g. methyl or ethyl, group.

An aqueous epoxy resin paint made with the composition of the present invention may further contain additives conventionally employed in coating technology, such as organic pigments, inorganic pigments, surfactants, thickeners, and the like.

In normal usage, after a water-borne paint composition is prepared using a polyamine curing agent, it is coated on a substrate by roller, spray, dip doctor blade, or similar application means. The film-formation and curing is accomplished by air-drying under ambient temperature conditions.

In addition to the aminoplast and phenolplast curing agents described hereinbefore, other crosslinking agents suitable for the one-package coating systems are novolacs, dibasic carboxylic acids, carboxyl phthalocyanines, dimer and trimer fatty acids, aliphatic and aromatic polycarboxylic acids, and their acid containing acrylic resins such as polyacrylic and polymethacrylic acids, anhydrides, amides and miscellaneous nitrogen compounds such as dicyandiamide and hydrazides. The various curing agents useful with epoxy resins are discussed in Lee and Neville's "Handbook of Epoxy Resins", McGraw-Hill (1967).

The following examples are further illustrative of the present invention. The reactants and other specific ingredients are presented as being typical, and various modifications can be derived in view of the foregoing disclosure within the scope of the invention. Parts and percentages unless otherwise specified are parts and percentages by weight.

EXAMPLE 1

Into a reactor equipped with a mechanical agitator, sampling device and thermometer were added 738.4 parts of Pluronic F-88 surfactant, a polyethylene oxide/polypropylene oxide block copolymer polyether surfactant having a molecular weight of 10,800, available from the BASF/Wyandotte Company, and 31.2 parts of Bisphenol A. The molar ratio of the Pluronic F-88 surfactant to Bisphenol A was 1 to 2. The entire mixture was heated under a nitrogen blanket to 55° C., and 0.8 part of dibutyl tin dilaurate was added, followed immediately by the addition of 30.4 parts of isophorone diisocyanate (equivalent to 2 moles). The entire mixture was then held at between 75° and 80° C. for approximately two hours. A product was produced which exhibited a Gardner-Holdt viscosity at 10% solids in water of U-V.

EXAMPLE 2

Into a reactor equipped as in Example 1, were added 895.4 parts of Epi-Rez 510 (a diglycidyl ether of Bisphenol A available from the Celanese Specialty Resins Company, having a weight per epoxide of about 190), 268.6 parts of Bisphenol A, and 36 parts of the product prepared in Example 1. The reactants were heated to 130° C. and 1.56 parts of triphenyl phosphine were added. The mixture was maintained at temperatures ranging from 130°-160° C. for approximately two hours, at which time the mixture was cooled to 94° C., the agitator was turned off, a solution of 299 parts of water and 168 parts of ethylene glycol monopropyl ether were added. The mixture was held under agitation for approximately one hour, and 515 parts of water were added, the first 125 parts drop-wise over a one-half hour period, and the remainder immediately thereafter. The resulting product exhibited a particle size in the range of 1-3 microns, and a 25° C. viscosity of 720 cps on a No. 2 Brookfield viscometer.

EXAMPLE 3

Utilizing essentially the same procedures as described in Example 1, the following surfactants were prepared as shown in Table I. In the table, the column labeled "Hydrophil Type" shows the polyether glycol used. Under the column "Poly-NCO" are listed the various types of diisocyanates employed and the number of moles of diisocyanate per mole of hydrophillic compound. Under the heading "Bisphenol Moles" are indicated the number of moles of Bisphenol A employed per mole of hydrophillic compound. "Rx. Temp." indicates the temperatures employed to prepare the reactive surfactants, and under "Viscosity" is listed the Gardner-Holdt 25° C. viscosity of the copolymer at 10% solids in water.

The following components were employed in these reactions:

Pl. F-88 is a polyethylene oxide/polypropylene oxide block copolymer having an average molecular weight of 10,800. It is available under the trade name Pluronic from the BASF/Wyandotte Company.

Pl. F-38 is a similar block copolymer having a molecular weight of 5,000.

Pl. F-77 is a similar block copolymer having a molecular weight of 6,600.

Pl. F-87 is a similar block copolymer having a molecular weight of 7,700.

Pl. F-108 is a similar block copolymer having a molecular weight of 14,000.

IPDI is isophorone diisocyanate.

TDI is toluene diisocyanate.

TABLE I

| Ex. No. | Hydrophil Type | Poly-NCO Type | Poly-NCO Moles | Bisphenol Moles | Rx. Temp. | Viscosity |
|---|---|---|---|---|---|---|
| A | Pl. F-88 | IPDI | 2 | 2 | 52-64 | V-W |
| B | Pl. F-88 | TDI | 2 | 2 | 53-62 | |
| C | Pl. F-88 | IPDI | 3.5 | 3.5 | 58-72 | V-W* |
| D | Pl. F-88 | IPDI | 2 | 2 | 55-60 | X-Y |
| E | Pl. F-88 | IPDI | 5 | 5 | 53-58 | Soft gel |
| F | Pl. F-38 | IPDI | 2 | 2 | 53-60 | K-L |
| G | Pl. F-77 | IPDI | 2 | 2 | 53-60 | O-P |
| H | Pl. F-87 | IPDI | 2 | 2 | 52-62 | V-W |
| I | Pl. F-108 | IPDI | 2 | 2 | 59-68 | Z-$Z_1$ |

*Viscosity at 5% solids in water.

EXAMPLE 4

Utilizing essentially the same procedures described in Example 2, the following epoxy resin dispersions were prepared and dispersed in water at 55% solids. In Table II, the column labeled Table I Example shows the surfactant having the corresponding letter in Table I. "% Surfactant" indicates the percent surfactant co-reacted with the diglycidyl ether and the dihydric phenol based upon the total weight of the diglycidyl ether, dihydric phenol and dispersant. The column headed "Visc." indicates the viscosity of the material at 55% solids in water at 25° C. using a #2 spindle Brookfield viscometer. The column headed "Particle Size Dist." indicates the percent of the dispersed particles falling within each of the particle size ranges given in microns.

TABLE II

| Ex. No. | Table I Example | % Surfactant | Visc. | Particle Size Dist. 0.6-1.0 | 1.0-2.5 | 2.5 |
|---|---|---|---|---|---|---|
| A | A | 3 | 504 | 56 | 44 | 0 |
| B | B | 3 | Unstable | | | |
| C | C | 3 | 294 | 35 | 64 | 1 |
| D | D | 3 | 172 | 43 | 55 | 2 |
| E | E | 3 | 100 | 14 | 73 | 13 |
| F | F | 3 | Unstable | | | |
| G | G | 3 | 710 | 1 | 1 | 98 |
| H | H | 3 | 73 | 13 | 57 | 30 |
| I | I | 3 | 134 | 10 | 63 | 27 |

EXAMPLE 5

A room temperature curable coating composition was prepared by blending the aqueous dispersion described as Example No. A of Table II with a polyamido-amine (Epi-Cure CT-60-8536-Celanese Specialty Resins Company). Example No. A had an epoxide equivalent weight of 518 on solids basis and was at 55% solids. The polyamido-amine had an amine hydrogen equivalent weight of 324, had 16% of its available amine nitrogens salted with acetic acid and had a solids content of 60% in a 60/20/20 weight ratio of monobutyl ether of ethylene glycol/monoethyl ether of ethylene glycol/toluene. The components were blended in the following proportions:

| Component | Equivalent Ratio Epoxy/Amine H | Wt. Solids Basis | Wt. Total |
|---|---|---|---|
| Example No. A | 1 | 12.4 | 22.55 |
| Polyamido-Amine | 1 | 7.6 | 12.66 |
| Water, Deionized | | | 14.8 |

The water was added to the polyamido-amine and stirred until a clear solution was obtained. Component Ex. No. A was then added and thoroughly mixed obtaining a milky white smooth dispersion.

Three mil drawdowns were made on both glass and phosphated steel panels. After one hour, the films had dried to a clear, glossy state and were essentially tack-free after 3-4 hours at room temperature (25°-27° C.). After seven days had elapsed, the films exhibited very high gloss, mar resistance and adhesion to both substrates. The pencil hardness was HB-F.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A co-reactive surfactant for epoxide resins having the general formula

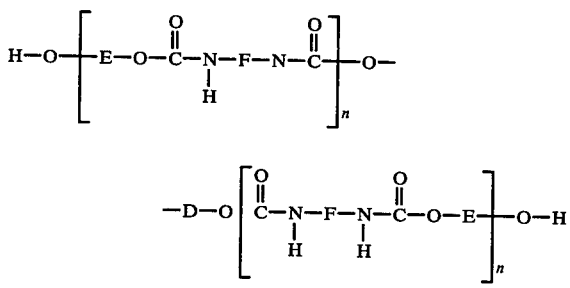

wherein D is the residue of a long-chain aliphatic polyether glycol, F is the residue of a diisocyanate and E is the residue of a dihydric phenol, and wherein n is 1-3.

2. The surfactant of claim 1 wherein D is the residue of an aliphatic polyether glycol having a molecular weight of about 1000 to about 15,000.

3. The surfactant of claim 2 wherein D is the residue of a polyethylene glycol.

4. The surfactant of claim 2 wherein D is the residue of a block copolymer of ethylene oxide and propylene oxide of about 5000-10,000 average molecular weight, having about 50 to about 90 weight percent reacted ethylene oxide and about 10 to about 50 weight percent reacted propylene oxide.

5. The surfactant of claim 1 wherein E is the residue of p,p'-dihydroxydiphenyl propane.

6. The surfactant of claim 1 wherein F is the residue of an aromatic or cycloaliphatic diisocyanate.

7. The surfactant of claim 6 wherein F is the residue of isophorone diisocyanate.

8. The surfactant of claim 6 wherein F is the residue of toluene diisocyanate.

9. A process for preparing a surfactant for epoxide resins which comprises reacting an aliphatic polyether glycol, a diisocyanate and a dihydric phenol in a molar ratio of 1 mole of glycol, x moles of diisocyanate and x moles of phenol wherein x has a value of 2-6.

10. The process of claim 9 wherein the aliphatic polyether glycol has a molecular weight of about 1000 to about 15,000.

11. The process of claim 10 wherein the aliphatic polyether glycol is polyethylene glycol.

12. The process of claim 10 wherein the aliphatic polyether glycol is a block copolymer of ethylene oxide and propylene oxide of about 5000-10,000 average molecular weight, having about 50 to about 90 weight percent reacted ethylene oxide and about 10 to about 50 weight percent reacted propylene oxide.

13. The process of claim 9 wherein the dihydric phenol is p,p'-dihydroxydiphenyl propane.

14. The process of claim 9 wherein the diisocyanate is an aromatic or cycloaliphatic diisocyanate.

15. The process of claim 14 wherein the diisocyanate is isophorone diisocyanate.

16. The process of claim 14 wherein the diisocyanate is toluene diisocyanate.

17. A water dispersible epoxy resin comprised of the reaction product of
(a) 40-90 parts by weight of a diglycidyl ether of a dihydric phenol;
(b) 5-35 parts by weight of a dihydric phenol; and
(c) 2-15 parts by weight of a co-reactive surfactant comprising the reaction product of
 (i) x moles of a diisocyanate;
 (ii) x moles of a dihydric phenol; and
 (iii) 1 mole of a long-chain aliphatic polyether glycol,
wherein x has a value of 2-6 and wherein the water dispersible epoxy resin has an average molecular weight of about 800 to about 20,000.

18. The water dispersible epoxy resin of claim 17 wherein the diglycidyl ether is a diglycidyl ether of p,p'-dihydroxydiphenyl propane having an epoxide equivalent weight of 170 to about 350.

19. The water dispersible epoxy resin of claim 17 wherein the dihydric phenol is p,p'-dihydroxydiphenyl propane.

20. The water dispersible epoxy resin of claim 17 wherein the long-chain aliphatic polyether glycol is a block copolymer of ethylene oxide and propylene oxide of about 5,000 to 10,000 average molecular weight having about 50 to about 90 weight percent reacted ethylene oxide and about 10 to about 50 weight percent reacted propylene oxide.

21. The water dispersible epoxy resin of claim 17 wherein the diisocyanate is toluene diisocyanate.

22. The water dispersible epoxy resin of claim 17 wherein the diisocyanate is isophorone diisocyanate.

* * * * *

UNITED STATES PATENT AND TRADEMARK OFFICE
CERTIFICATE OF CORRECTION

PATENT NO. : 4,423,201
DATED : December 27, 1983
INVENTOR(S) : Darrell D. Hicks

It is certified that error appears in the above—identified patent and that said Letters Patent is hereby corrected as shown below:

In column 2, lines 31-44 and Column 9, lines 37-50, delete the formula and insert

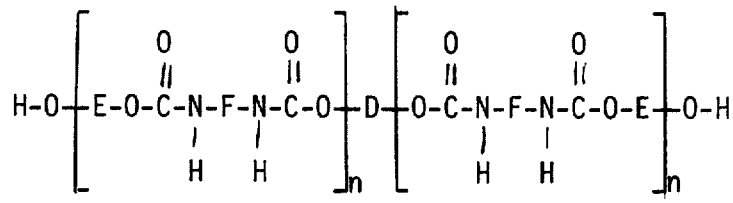

Signed and Sealed this

Twelfth Day of June 1984

[SEAL]

Attest:

Attesting Officer

GERALD J. MOSSINGHOFF

Commissioner of Patents and Trademarks